(12) United States Patent
Otto et al.

(10) Patent No.: US 7,494,189 B2
(45) Date of Patent: Feb. 24, 2009

(54) AXIAL FIXATION DEVICE FOR AN ARMREST

(75) Inventors: Jürgen Otto, Burscheid (DE); Kirubaharan Albert Reginold, Burscheid (DE)

(73) Assignee: Johnson Controls GmbH, Burscheid (DE)

(*) Notice: Subject to any disclaimer, the term of this patent is extended or adjusted under 35 U.S.C. 154(b) by 0 days.

(21) Appl. No.: 11/878,166

(22) Filed: Jul. 20, 2007

(65) Prior Publication Data

US 2008/0018160 A1    Jan. 24, 2008

Related U.S. Application Data

(63) Continuation of application No. PCT/EP2006/050131, filed on Jan. 10, 2006.

(51) Int. Cl.
B60N 2/46 (2006.01)

(52) U.S. Cl. ............... 297/411.32; 297/411.38

(58) Field of Classification Search ............ 297/411.32, 297/411.8, 411.38
See application file for complete search history.

(56) References Cited

U.S. PATENT DOCUMENTS

| | | | |
|---|---|---|---|
| 2,260,712 A | | 10/1941 | Harrison |
| 4,009,896 A | | 3/1977 | Brewer |
| 5,597,209 A | * | 1/1997 | Bart et al. ............... 297/411.38 |
| 5,702,157 A | * | 12/1997 | Hurite .................... 297/411.38 |
| 5,902,005 A | * | 5/1999 | Lewczyk et al. ...... 297/411.21 X |
| 5,909,901 A | | 6/1999 | Zillig et al. |
| 5,934,756 A | * | 8/1999 | Smith .................... 297/411.32 |
| 6,050,645 A | * | 4/2000 | Bradbury ............... 297/411.38 |
| 6,209,960 B1 | * | 4/2001 | Bradbury ........... 297/411.32 X |
| 6,447,069 B1 | * | 9/2002 | Terris et al. ........ 297/411.32 X |
| 6,578,922 B2 | * | 6/2003 | Khedira et al. .......... 297/411.32 |
| 6,698,838 B2 | * | 3/2004 | Kain ..................... 297/411.32 |
| 6,752,462 B1 | * | 6/2004 | Kain et al. ............. 297/411.38 |
| 6,883,871 B2 | * | 4/2005 | Nae et al. .............. 297/411.32 |
| 6,916,068 B2 | * | 7/2005 | Kitamura et al. .... 297/411.32 X |
| 7,077,477 B1 | * | 7/2006 | Syrowik et al. ........ 297/411.32 |
| 7,140,688 B2 | * | 11/2006 | Hann ..................... 297/411.32 |
| 7,198,331 B2 | * | 4/2007 | Omori .................... 297/411.32 |
| 7,284,799 B2 | * | 10/2007 | Chung ................... 297/411.38 |
| 2002/0096928 A1 | * | 7/2002 | Bidare ................... 297/411.32 |
| 2003/0057759 A1 | * | 3/2003 | Kain ..................... 297/411.32 |
| 2006/0061189 A1 | * | 3/2006 | Yamane et al. ......... 297/411.32 |

FOREIGN PATENT DOCUMENTS

GB    1 303 475    1/1973

OTHER PUBLICATIONS

PCT International Search Report based on International Application PCT/EP2006/050131, date of submission of Search Report Dec. 5, 2006 (4 pp.).

* cited by examiner

*Primary Examiner*—Rodney B. White
(74) *Attorney, Agent, or Firm*—Foley & Lardner LLP

(57) ABSTRACT

A device for the axial fixation of a shaft in a component including a groove which is defined on the shaft and a securing device configured to releasably engage the groove. The axial force is required for releasing the securing device being able to be altered depending on the rotational position of the securing device relative to the shaft. The device may be coupled to an armrest of a vehicle seat.

18 Claims, 5 Drawing Sheets

AXIAL FIXATION DEVICE FOR AN ARMREST

CROSS-REFERENCE TO RELATED PATENT APPLICATIONS

The present application is a Continuation of International Application No. PCT/EP2006/050131 filed Jan. 10, 2006, which claims the benefit of German Priority Application No. DE 10 2005 002 853.5 filed Jan. 20, 2006. The disclosures of International Application No. PCT/EP2006/050131 and German Priority Application No. DE 10 2005 002 853.5 are incorporated herein by reference in their entirety.

BACKGROUND

There is presented a device for the axial fixation of a bolt or a shaft in a component or for the axial fixation of a component to a bolt or a shaft, and more particularly, to an armrest of a vehicle seat including the device for axial fixation of the armrest to the seat.

The device is, for example, disclosed in the German patent DE 199 04 713 C1. This device, however, has the drawback that it may only be released by a specific tool, which firstly means an increased assembly cost and secondly prevents use of the device in restricted spatial conditions. The device for axial fixation with a bolt and/or a hollow shaft, with an external and/or internal radial groove as well as with a securing device provided with tongues projecting inwardly and/or outwardly and distributed over its periphery does not have this drawback, the tongues being able to be brought into releasable engagement with the groove. Said device may be released without tools. The securing device provided with tongues is, however, a sharp-edged component which is relatively difficult to produce.

SUMMARY

One exemplary embodiment relates to a device for the axial fixation of a shaft in a component including a groove which is defined on the shaft and a securing device configured to releasably engage the groove. The axial force required for releasing the securing device varies depending on the rotational position of the securing device relative to the shaft.

In another exemplary embodiment, there is provided an armrest including a shaft coupled to a holder including a device. The device includes a groove which is defined on the shaft and a securing device configured to releasably engage the groove. The axial force required for releasing the securing device is able to be altered depending on the rotational position of the securing device relative to the shaft.

In another exemplary embodiment, there is provided a seat including a seatback. The seatback includes an armrest including a shaft, coupled to the seatback. A device for axial fixation of the armrest to the seatback includes a groove which is defined on the shaft and a securing device configured to releasably engage the groove. The axial force required for releasing the securing device varies depending on the rotational position of the securing device relative to the shaft

DESCRIPTION

This disclosure presents a device for the axial fixation of a bolt or a shaft in a component or for the axial fixation of a component to a bolt or a shaft, by a means which is arranged on the shaft or the bolt and with a securing device which may be brought positively and/or non-positively as well as releasably into engagement with the means, the axial force required for releasing the securing device being able to be altered depending on the rotational position thereof relative to the bolt or the shaft and the securing device being a wire structure.

It was extremely surprising and unexpected for the person skilled in the art that, with a simple wire structure, a device may be produced for the axial fixation of a bolt or a shaft in a component or for the axial fixation of a component to a shaft. The device according to the invention allows the securing of a bolt or a shaft and the release of a bolt or a shaft without a tool by rotating the means and the securing device relative to one another. The device according to the invention has to The wire structure may be easily and cost-effectively produced. It comprises no sharp edges, so that the wear of the device according to the invention is low.

The securing device preferably comprises at least two fixing regions which may, however, be simultaneously brought releasably positively and/or non-positively into engagement with the means, the means comprising at least one release region and the number of fixing regions being greater than the number of release regions.

Also presented is another embodiment of a device for the axial fixation of a bolt or a shaft in a component or for the axial fixation of a component to a bolt or a shaft, by a means which is arranged on the shaft or the bolt and by a securing device which may be brought positively and/or non-positively as well as releasably into engagement with the means, in which the axial force required for releasing the securing device may be altered depending on the rotational position thereof relative to the bolt or the shaft and in which the securing device comprises at least two fixing regions which may, however, be simultaneously brought releasably positively and/or non-positively into engagement with the means, the means comprising at least one release region and the number of fixing regions being greater than the number of release regions.

The device may also be produced exceptionally easily, and a bolt or a shaft may be secured thereto or dismantled without tools. Preferably, in this embodiment of the device the securing device is a wire structure. The wire structure has no sharp edges so that the wear of the device according to the invention is low.

Figure 1:
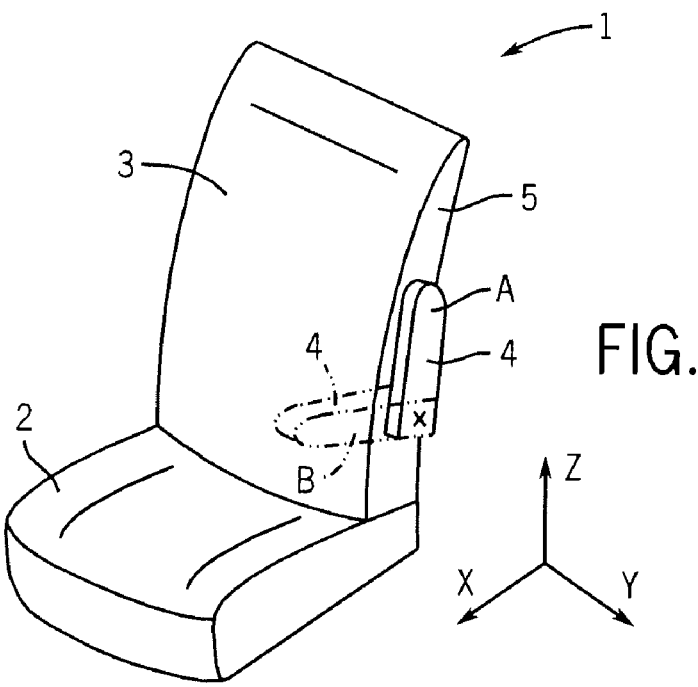
FIG. 1 shows a vehicle seat with an armrest, which is axially secured to the seat.

The vehicle seat 1 shown in FIG. 1 consists of a seat part 2 and a backrest, also referred to as a seatback 3 which is provided laterally with an armrest 4. The armrest may be folded from a substantially vertical stowing position A, in which it bears against the side face 5 of the seatback 3, into a substantially horizontal position of use B. In both positions, which in practice are not merely briefly adopted by the armrest 4, it is ensured that with the occurrence of lateral forces (Y direction of the vehicle) the armrest is not released from the seatback 3 and does not endanger the passengers of the vehicle.

Figure 2:
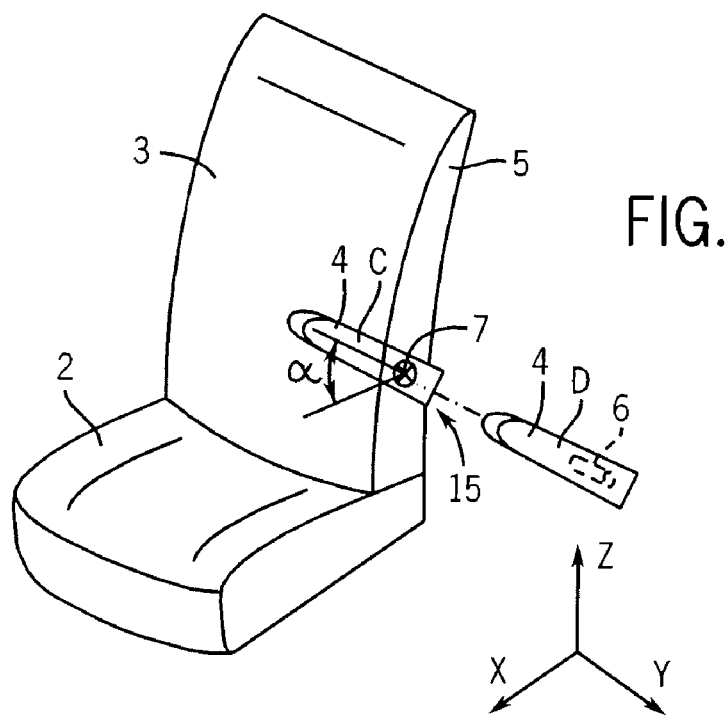
FIG. 2 shows the vehicle seat according to FIG. 1 when releasing the armrest.

In FIG. 2 the armrest 4 is shown in an intermediate position C which is located between the stowing position A and the position of use B and into which the armrest 4 only briefly moves when pivoted. Precisely in this position, which is identified by the angle a and which for example may be 45°, the armrest 4 may be pulled toward the side (Y direction) out of the backrest (position D).

As a result of this configuration, both in normal use and also in the event of an accident, the inadvertent release of the armrest 4 is eliminated. The theoretical possibility that the armrest 4, manually in the event of an accident or by its mass inertia, is pivoted precisely as far as an angle a and at this moment is laterally loaded, is of no importance in practice.

The armrest, especially for a motor vehicle, which is connected to a shaft which is mounted in a holder which comprises the device. The armrest is connected fixedly in terms of rotation to the shaft and the shaft is rotatably mounted in the fixed holder. Further, the armrest is unreleasably connected to the holder in its positions of use and releasably connected thereto in at least one intermediate position. The holder is, in turn, preferably a portion of a seat, especially a vehicle seat.

Figure 3:
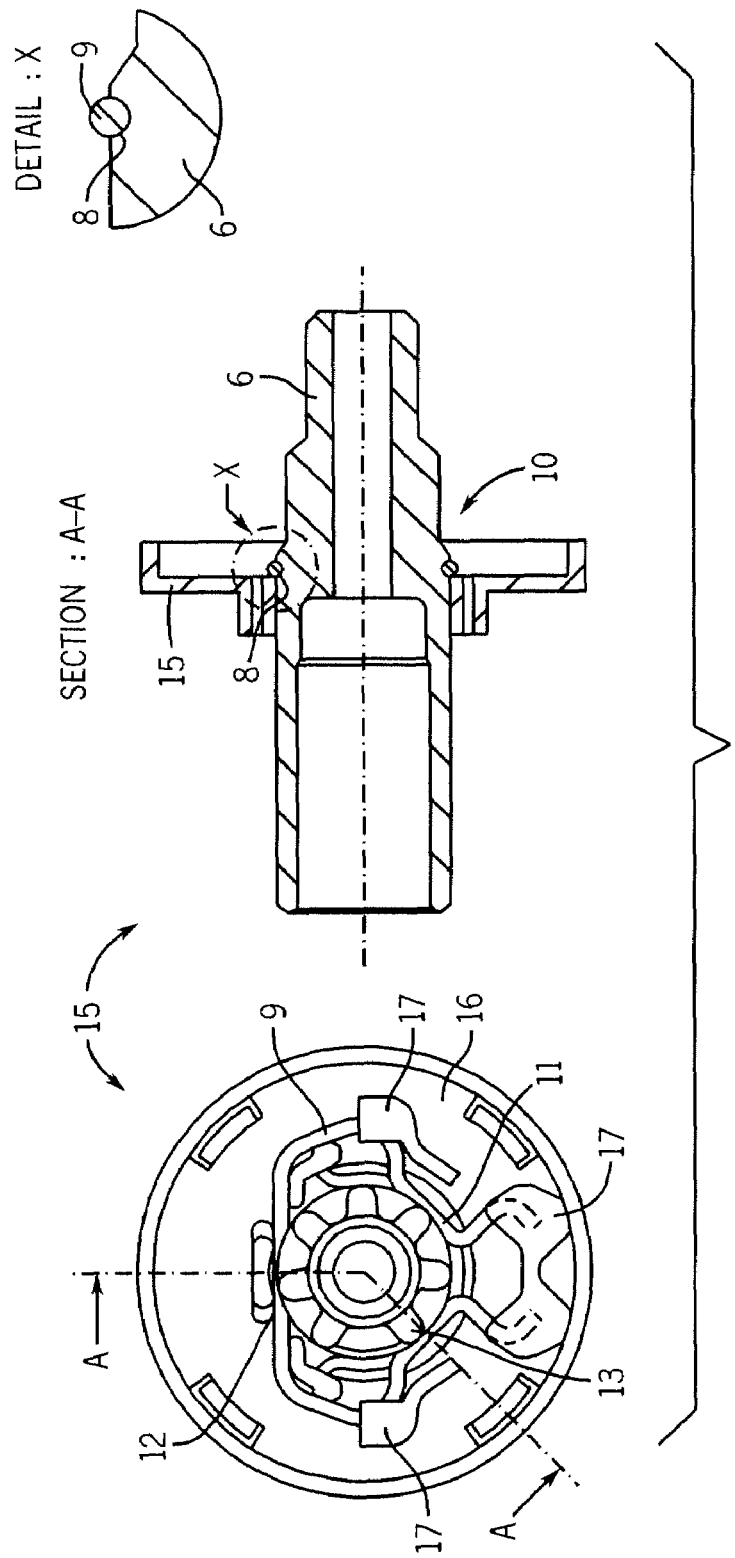
FIG. 3 shows an exemplary embodiment of the axial device in a position in which the bolt may not be pulled out of the holder.

As is visible from FIG. 2, the armrest 4 comprises a bolt 6 projecting in the direction of the seatback 3, connected fixedly in terms of rotation to the armrest 4 which may be inserted through the opening 7 in the side face 5 into a holder 15 arranged fixedly in the backrest and axially secured there (see FIG. 3). The holder 15 comprises a securing device. The construction of the securing device and its cooperation with the bolt 6 is shown in detail in the Figures.

FIG. 3 shows a holder 15 in two views and a detailed view. The holder 15 comprises a housing part 16. The securing device 9, also referred to as a clip, is substantially arranged fixedly in terms of rotation on this housing part 16, preferably entirely arranged fixedly in the terms of rotation, but movable inside the holder 17. The securing device 9 in the present case is a clip of substantially U-shaped form which is made from a round resilient material, for example steel wire. The said clip of U-shaped form comprises a substantially rigid base region to which two relatively flexible, partially resiliently deformable arms are attached on the right and on the left. The clip 9 is located with its fixing regions 11-13 in the groove 8, i.e. the fixing regions 11-13 are positively and/or non-positively connected to the groove 8 and prevent the bolt 6 from being able to be removed from the holder 15. The bolt 6 is rotatably mounted i.e. it may be rotated relative to the securing device 9. In FIG. 3, the bolt 6 is, therefore, secured against axial displacement relative to the holder 15 by the securing device and thus secured to the seat 1. The axial removal force is more than 200 N.

Figure 4:
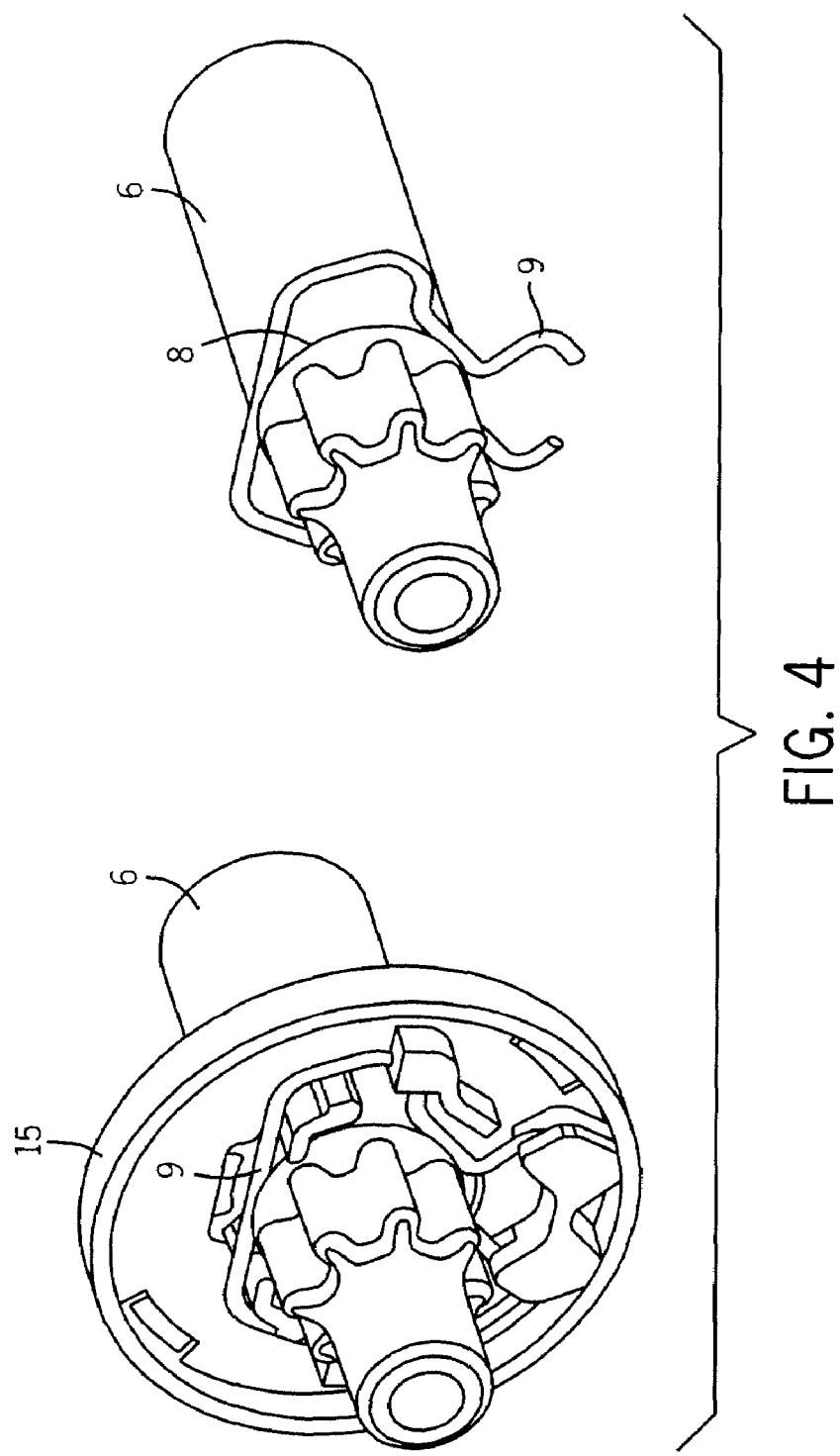
FIG. 4 shows a perspective view of the device illustrated in FIG. 3.

FIG. 4 shows the device in the secured state shown in FIG. 3 in a perspective view. The clip 9 bears against three locations in the groove 8 and thus prevents an axial movement of the bolt, so that the bolt may not be inadvertently removed from the holder 15.

Figure 5:
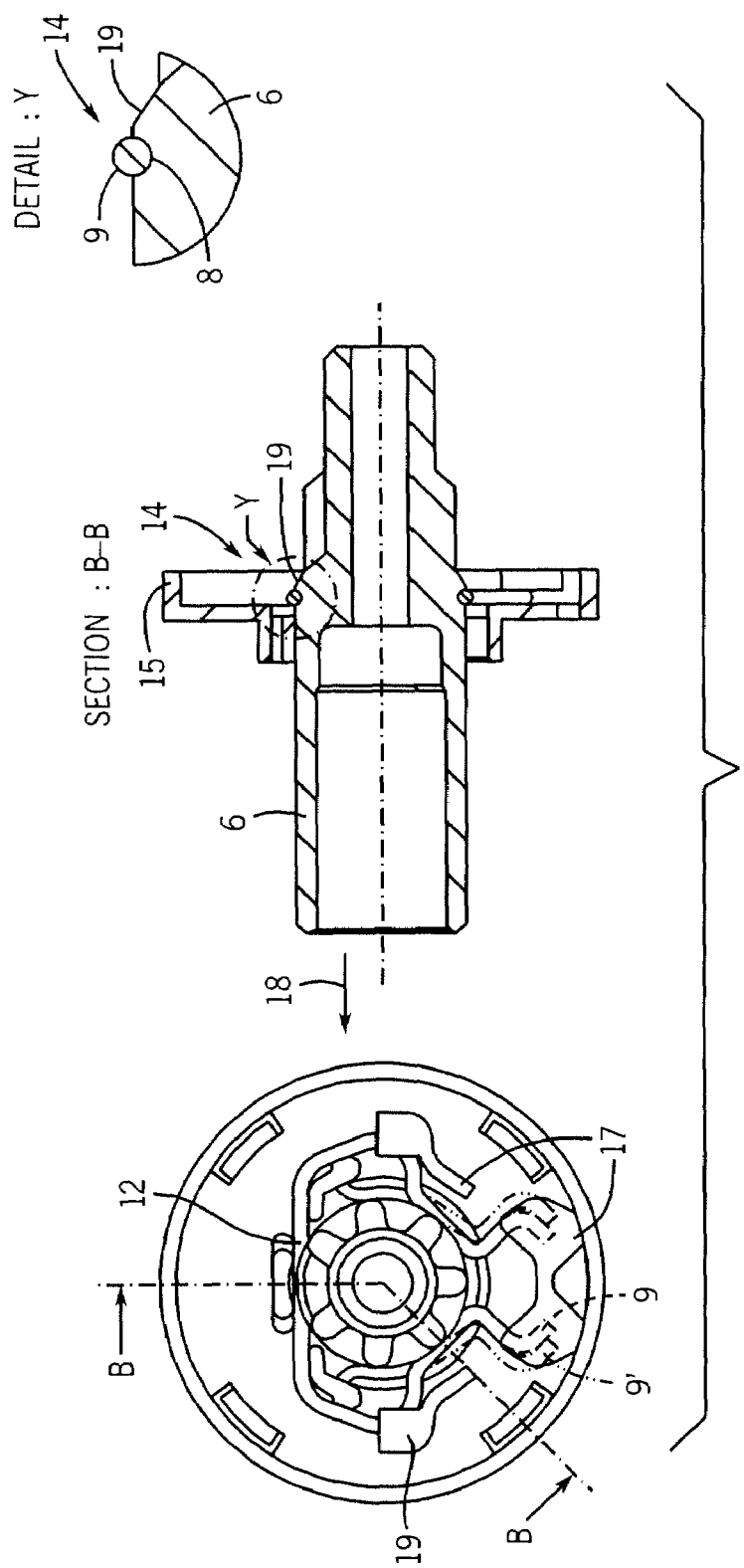
FIG. 5 shows the axial device illustrated in FIG. 3 in a position in which the bolt is not secured by the securing device.

The device illustrated in FIGS. 3 and 4 is shown in FIG. 5 but in the unsecured state in two views and a detailed view. In the present case, the bolt 6 has been rotated into the position identified by the angle α, for example 45°, until the release region 14 overlapped the fixing region 12. In the release region 14 (as is very clearly visible in the detail Y) a flank of the groove is flattened and/or removed, so that in the flattened region in one direction (counter to the direction identified by the arrow 18), a positive and/or non-positive connection is not provided between the clip 9 and the groove 8. Moreover, the release region 14 comprises a ramp 19 along which the clip 9 may be moved and which is of conical form. The person skilled in the art recognizes that said ramp 19 does not necessarily have to be present. If the bolt is now pulled in the direction identified by the arrow 18, the fixing region 12 moves out of the groove 8 along the ramp 19. As a result, the arms of the clip are released and move into the position identified by the reference numeral 9' i.e. the fixing regions 11, 13 are also released, at least partially, out of the groove, so that with a relatively small force expenditure, the bolt 6 may be removed from the securing device 8 and thus out of the holder 15. This disassembly is carried out without the use of a tool. The assembly of the armrest is carried out in the reverse manner.

Figure 6:
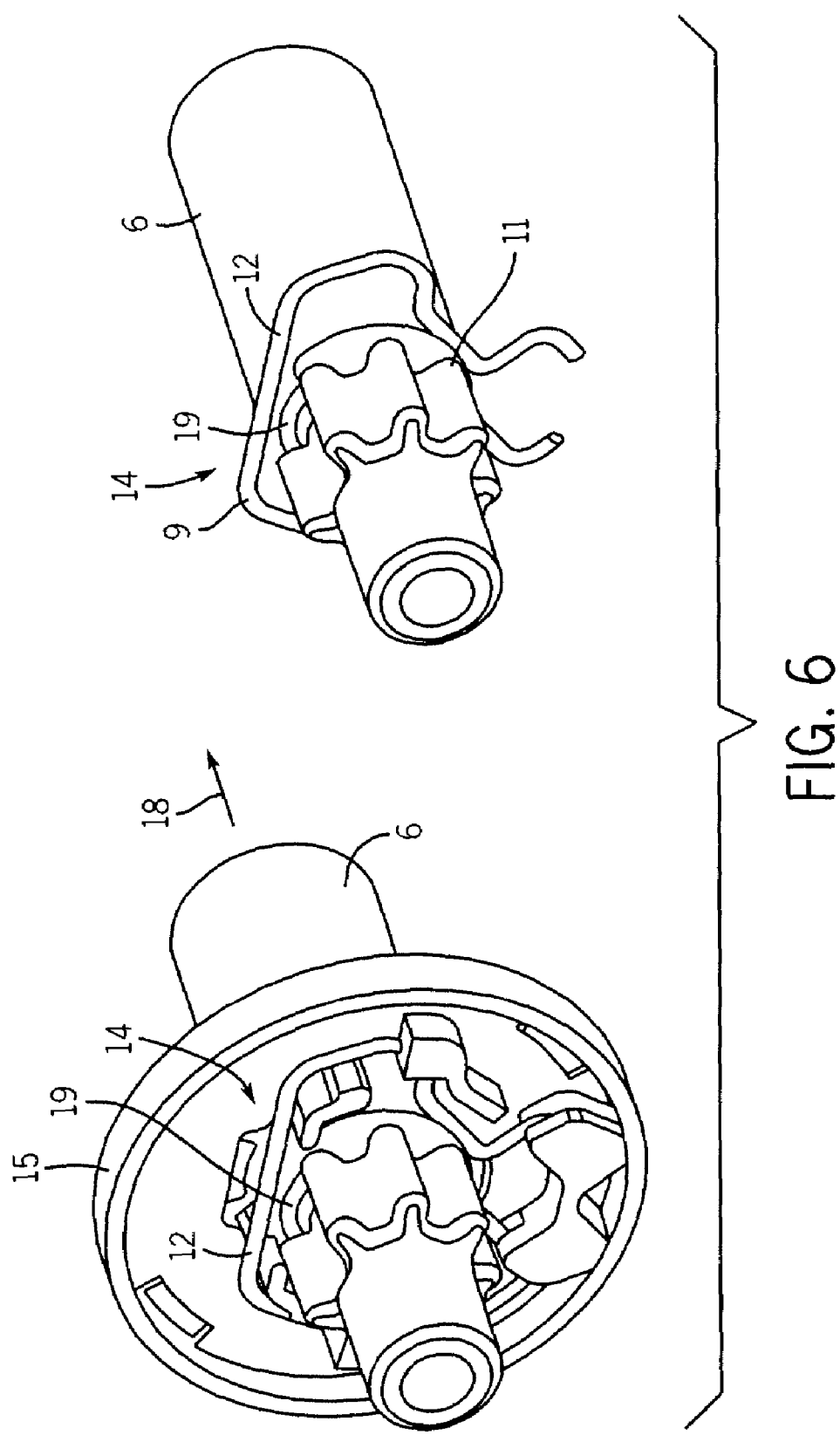
FIG. 6 shows a perspective view of the device illustrated in FIG. 5.

The unsecured state of the device is shown in perspective in FIG. 6. In this state, the bolt 6 may be pulled in the direction 18 identified by the arrow out of the securing device and thus out of the holder 15. It may be seen that the ramp 19 is of conical form. If the bolt 6 is pulled in the direction identified by the arrow 18, the flexible arms of the U-profile are distorted, and move away from the bolt and the securing device 9 may be removed from the groove 8, without the holder or the seat being damaged.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature The person skilled in the art recognizes that the holder does not have to be accessible either for the release or for the insertion of the armrest into the seat. It may thus be arranged entirely behind cladding or a cover and be assembled or disassembled without any tool.

What is claimed is:

1. An armrest comprising:
a holder;
a shaft coupled to the holder and the holder including a securing device comprising:
a recess which is defined on the shaft; and
a securing member configured to releasably engage the recess, wherein the axial force required for releasing the securing member varies with the rotational position of the securing device relative to the shaft.

2. The armrest as claimed in claim 1 wherein the armrest is fixedly, rotatably connected to the shaft and the shaft is rotatably mounted in the holder.

3. The armrest as claimed in claim 1 wherein the armrest is unreleasably connected to the holder in a use position and is releasably connected to the holder in at least one intermediate position.

4. A seat including a seatback comprising:
an armrest including a shaft coupled to the seatback; and
a device for axial fixation of the armrest to the seatback, the device comprising:
a groove which is defined on the shaft and a securing device configured to releasably engage the groove, wherein the axial force required for releasing the securing device varies depending on the rotational position of the securing device relative to the shaft.

5. The seat as claimed in claim 4 wherein the securing device includes at least two fixing regions in the groove, and the groove comprises at least one release region, wherein the number of fixing regions are greater than the number of release regions.

6. The seat as claimed in claim 5 wherein the connection between the groove and the securing device is reduced in the release region.

7. The seat as claimed in claim 4 wherein the securing device is a wire structure.

8. The seat as claimed in claim 4 wherein the shaft is a bolt.

9. A seat including a seatback comprising:
 an armrest including a shaft coupled to the seatback; and
 a device for axial fixation of the armrest to the seatback, the device comprising:
  a groove which is defined on the shaft and a securing device configured to releasably engage the groove, wherein the axial force required for releasing the securing device varies depending on the rotational position of the securing device relative to the shaft,
 wherein the securing device includes at least two fixing regions in the groove, and the groove comprises at least one release region, wherein the number of fixing regions are greater than the number of release regions, and
 wherein the groove is at least partially flattened in the release region and further includes a ramp located proximal to the flattened part.

10. The seat as claimed in claim 9 wherein the securing device is formed of wire.

11. The seat as claimed in claim 9 wherein the shaft is a bolt.

12. The seat as claimed in claim 9 wherein the securing device is of substantially U-shaped form.

13. The seat as claimed in claim 9 wherein the securing device is pretensioned when engaging the groove.

14. The seat as claimed in claim 9 wherein the securing device is part of a holder mounted to the shaft.

15. The seat as claimed in claim 14 wherein the armrest is fixedly, rotatably connected to the shaft and the shaft is rotatably mounted in the holder.

16. The seat as claimed in claim 4 wherein the securing device is of substantially U-shaped form.

17. The seat as claimed in claim 4 wherein the securing device is pretensioned when engaging the groove.

18. The seat as claimed in claim 4 wherein the securing device is part of a holder in which the shaft is mounted.

* * * * *